United States Patent [19]
Lyon

[11] Patent Number: 5,309,201
[45] Date of Patent: May 3, 1994

[54] VIEWFINDER LENS WITH MOLDED INTEGRAL AIMING CIRCLE

[75] Inventor: Ralph M. Lyon, Rochester, N.Y.

[73] Assignee: Eastman Kodak Company, Rochester, N.Y.

[21] Appl. No.: 941,824

[22] Filed: Sep. 8, 1992

[51] Int. Cl.$^5$ ............................................. G03B 13/02
[52] U.S. Cl. ..................................... 354/219; 359/707
[58] Field of Search ............... 354/219, 222, 220, 221, 354/223; 359/642, 707, 741, 798

[56] References Cited

U.S. PATENT DOCUMENTS

| | | | |
|---|---|---|---|
| 1,960,254 | 5/1934 | McCandless | 354/199 |
| 2,350,237 | 5/1944 | Kende et al. | 354/222 X |
| 4,537,732 | 8/1985 | Ueda et al. | 264/1.1 |

Primary Examiner—Michael L. Gellner
Assistant Examiner—Howard B. Blankenship
Attorney, Agent, or Firm—Roger A. Fields

[57] ABSTRACT

A camera viewfinder has a viewfinder lens comprising a plastic lens element with a molded integral aiming circle whose molded optical finish is different than the molded optical finish of the remainder of the lens surface to make the aiming circle visible.

4 Claims, 2 Drawing Sheets

VIEWFINDER LENS WITH MOLDED INTEGRAL AIMING CIRCLE

BACKGROUND OF THE INVENTION

1. Field of the Invention

The invention relates generally to the field of photography, and in particular to a viewfinder lens for a camera viewfinder.

2. Description of the Prior Art

When taking a picture it is necessary to know not only in what direction to aim the camera but also how much of the subject will be included in the picture. For this reason practically every camera has a viewfinder of some kind.

It is well known to include an aiming circle or crosshairs in the viewfinder tunnel of a camera. However, these prior art aiming devices existed apart from any viewfinder lens and, therefore, added to the bulk of the camera. More recently, it has become known to mold a lens element for a viewfinder with a lens surface that is integrally textured to have an optically clear finish. After the lens element is constructed an aiming device can be painted or etched on the lens surface. However, this is a time-consuming process.

PROBLEM TO BE SOLVED BY THE PRIOR ART

Previous combinations of lens elements and aiming devices for camera viewfinders were non-integral and, therefore, added to the bulk of the camera and/or involved a time-consuming process to assemble them.

SUMMARY OF THE INVENTION

A viewfinder lens comprising a lens element with a lens surface that is molded integrally textured, is characterized in that:

a small portion of the lens surface is molded integrally textured differently than the remainder of the lens surface is molded integrally textured, along one or more lines positioned with respect to a centerpoint of the lens surface to provide a molded integral aiming device for the lens element.

More specifically, the small portion of the lens surface has a molded integral fine matte finish in the shape of a circle, and the remainder of the lens surface has a molded integral optically clear finish to make the circle visible when looking through the lens element

DETAILED DESCRIPTION OF THE PREFERRED EMBODIMENT

The invention is disclosed as being embodied in a camera viewfinder. Because such viewfinders are well known, this description is limited to a viewfinder lens. It is to be understood, however, by one of ordinary skill in the art that viewfinder components not shown or described may take various known forms.

Figure 1:
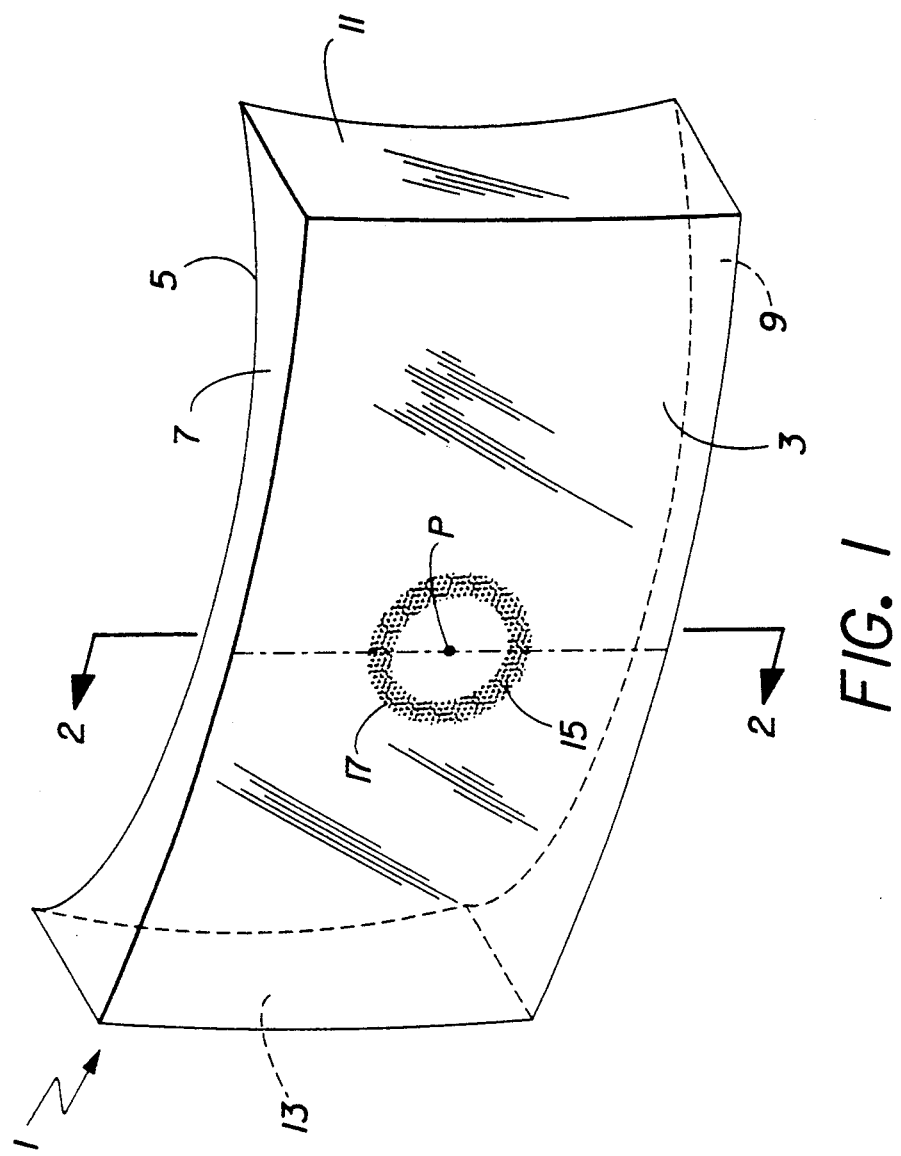
FIG. 1 is a front perspective view of a viewfinder lens with a molded integral aiming circle according to a preferred embodiment of the invention.
Figure 2:
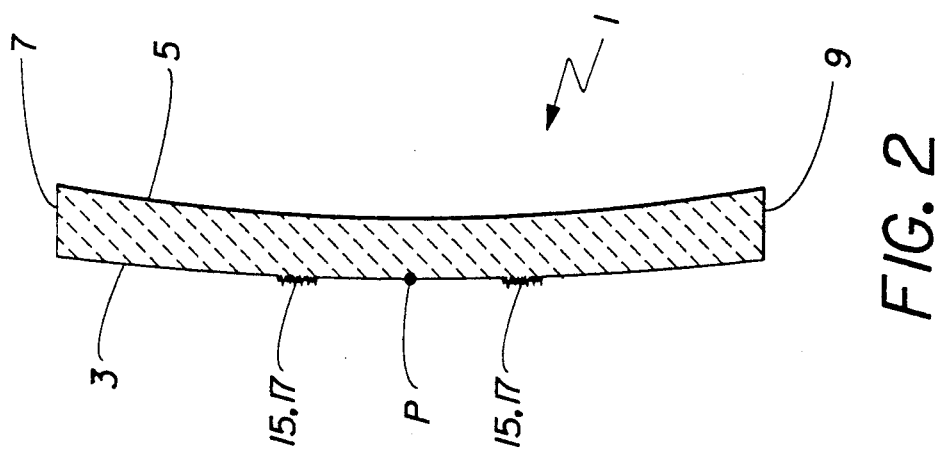
FIG. 2 is a cross-sectional view of the viewfinder lens as seen in the direction of the lines 2—2 in FIG. 1.

FIGS. 1 and 2 show a plastic molded lens element 1 for a viewfinder lens having a front convex lens surface 3, a back concave lens surface 5 which is differently curved than the front lens surface, a pair of parallel flat top and bottom surfaces 7 and 9, and a pair of parallel end or side surfaces 11 and 13.

According to the invention, the front lens surface 3 has a molded, i.e. integral, microfinish texture that for the most part is optically clear. By "optically clear", it is meant that the peak-to valley elevation which constitutes the front lens surface 3 is extremely small, for example 0.00000236 inches. Conversely, a small portion 15 of the front lens surface 3 in the shape of a ring 17 concentrically located about a centerpoint P of the front lens surface has a molded, i.e. integral, microfinish texture that is fine matte rather than optically clear. By "fine matte", it is meant that the peak-to valley elevation which constitutes the small portion 15 (the ring 17) is not as small as for optically clear, for example 0.000124 inches. This difference in the molded microfinish texture between the small portion 15 and the remainder of the front lens surface 15 makes the ring 17 visible in order to serve as an aiming circle in a camera viewfinder.

The invention has been described with reference to a preferred embodiment. However, it will be appreciated that variations and modifications can be effected within the ordinary skill in the art without departing from the scope of the invention. For example instead of the small portion 15 of the front lens surface 5 being in the shape of the ring 17, other diverse known shapes are possible such as cross-lines which cross at the centerpoint P.

I claim:

1. A viewfinder lens comprising a lens element with a lens surface that is molded integrally textured, characterized in that:

a small portion of said lens surface is molded integrally textured differently than the remainder of the lens surface is molded integrally textured, along at least one line positioned with respect to a centerpoint of the lens surface to provide a molded integral aiming device for said lens element which is the same material as the remainder of the lens element.

2. A viewfinder lens as recited in claim 1, wherein said small portion of the lens surface is molded integrally textured relatively-roughly and said remainder of the lens surface is molded integrally textured relatively-smoothly to make the difference between the two visible when looking through said lens element.

3. A viewfinder lens as recited in claim 1, wherein said small portion of the lens surface has a molded integral fine matte finish and said remainder of the lens surface has a molded integral optically clear finish to make the difference between the two visible when looking through said lens element.

4. A viewfinder lens as recited in claim 1, wherein said one line positioned with respect to the centerpoint of said lens surface is ring-shaped concentrically about the centerpoint to form an aiming circle.

* * * * *